Patented June 8, 1943

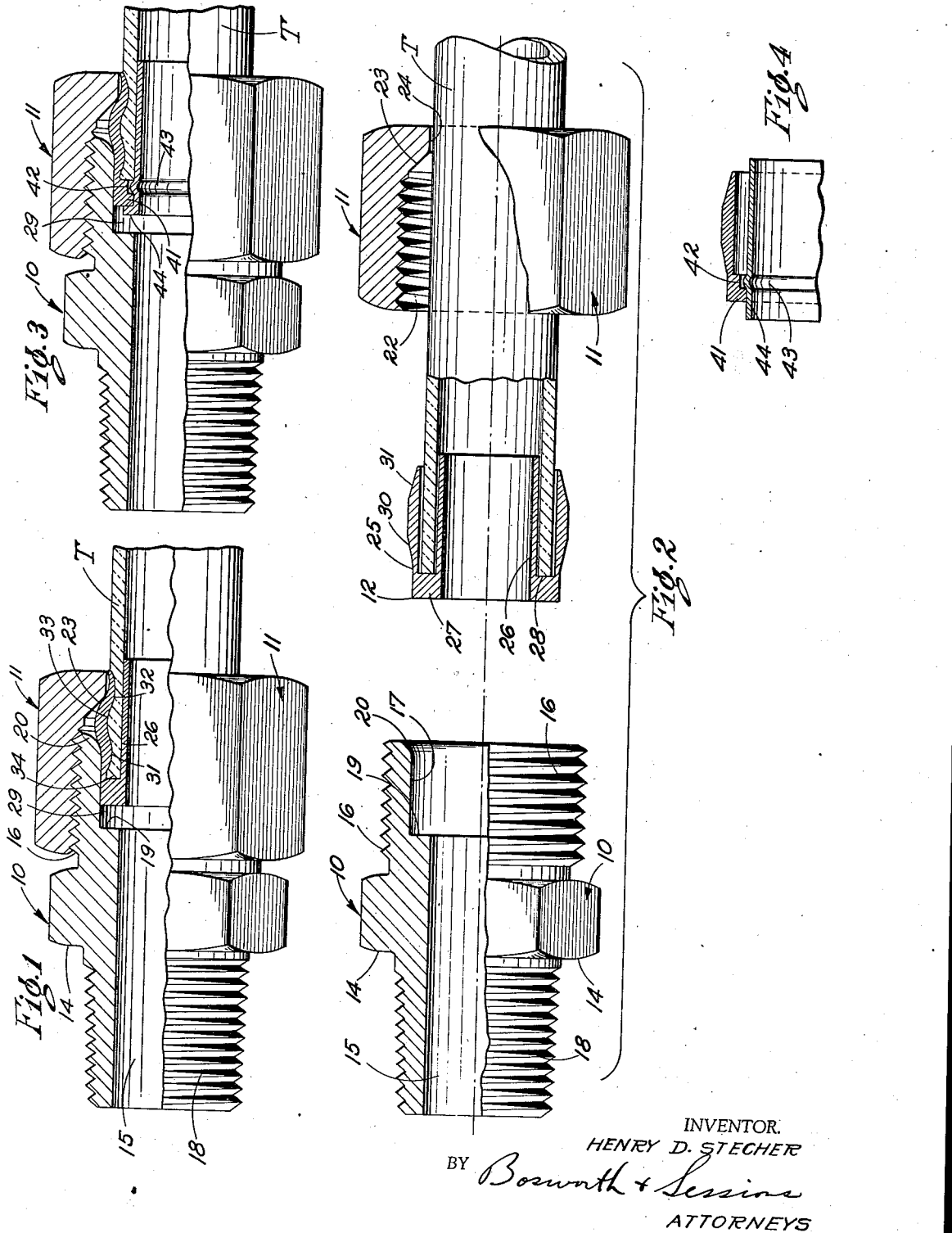

2,321,260

UNITED STATES PATENT OFFICE 2,321,260

TUBE COUPLING

Henry D. Stecher, Lakewood, Ohio, assignor to The Weatherhead Company, Cleveland, Ohio, a corporation of Ohio Application May 23, 1942, Serial No. 444,167

10 Claims. (Cl. 285—86)

This invention relates to tube couplings and more particularly to couplings especially adapted for use with tubing composed of plastic materials, such as the tubing marketed under the trade name of "Saran," and tubing composed of plastics of the cellulose acetate butyrate type.

Tubing of this sort is highly advantageous for many purposes because of its transparency, resistance to vibration, flexibility and strength. However, couplings or fittings for plastic tubing have presented a problem, for couplings adapted for flexible rubber hoses are not satisfactory, nor are conventional types of couplings or fittings designed primarily for use with metallic tubes. The reason for this is that the plastic tubing does not have the wall thickness and body to enable it to be secured in hose couplings, and its strength and resistance to crushing are not sufficiently high to give satisfactory results in couplings designed for use with ordinary metallic tubes.

Accordingly, it is a general object of my invention to provide a tube coupling designed especially for use with plastic tubing and which will give strong leak-proof connections; another object is to provide such a tube coupling which can be economically and readily manufactured; another object is to provide a tube coupling which can be utilized easily and which requires no particular skill in securing to the end of a tube. Further objects and advantages will become apparent from the following description of preferred forms thereof, reference being made to the accompanying drawing. The essential characteristics are summarized in the claims.

In the drawing, Figure 1 is a cross-sectional view illustrating a coupling made according to my invention with a tube secured therein; Figure 2 is an expanded view showing the parts making up the coupling of Figure 1 before the parts have been screwed together to secure the tube; Figure 3 is a cross-sectional view showing a slightly modified coupling with a tube clamped therein, and Figure 4 is a cross-sectional detail showing one step in the production of the clamping sleeve employed in the coupling shown in Figure 3.

As illustrated in Figures 1 and 2, a coupling made according to a preferred form of my invention may comprise a body member 10, a nut 11, and a clamping member 12 which engages the end of the tube T. The body member and the nut are quite similar to corresponding parts used in conventional compression type fittings employed for metallic tubes. The body member preferably comprises a central, hexagonal wrench engaging portion 14 with a passageway 15 extending therethrough. At one end the body has an externally threaded projection 16 having an enlarged recess 17 therein which is adapted to receive the end of a tube to be coupled. On the other side of the hexagonal projection 14 the body member is arranged with suitable means for connecting the fitting to another fluid conducting passageway or conduit such as, for example, the pipe threaded projection 18. The recess 17 communicates with the passageway 15, there being a shoulder 19 between the two portions, and the outer end of the recess 17 is provided with a flared mouth 20.

The nut 11 is preferably of hexagonal shape as shown and is provided with internal threads 22 to engage the external threads 16 of the body portion. Opposite the open end of the threaded recess of the nut, there is an internal extending conical surface 23 which is carried inwardly leaving an opening 24 slightly larger in diameter than the tube T. When the nut and body are screwed together, the flared open end 20 of the body and the conical surface of the nut engage the clamping member 12 to retain it within the assembly and also to deform it into clamping engagement with the tube T.

The clamping member 12 preferably comprises an external sleeve portion 25, an internal nipple or supporting portion 26, and a connecting portion 27. The sleeve and nipple together provide an annular space adapted to receive the end of the hose T, while the connecting portion provides a shoulder against which the end of the hose may abut as indicated at 28. The annular space between the sleeve and nipple portions is proportioned with respect to the wall thickness and diameter of the tube so that the end of the tube may be readily inserted therein and pushed into engagement with the end wall 27. Preferably the initial fit between the clamping member 12 and the tube T is rather loose to accommodate slight variations in tube diameter and wall thickness. Also a slight enlargement of the annular space as compared to the tube results in a better clamping action between the clamping ring and the tube and a stronger and more secure connection, as will appear more fully below.

The connection is made by assembling the parts as shown in Figure 2, then inserting the clamping member 12 and associated hose end into the recess 17 and screwing the nut and body together to the position shown in Figure 1. The opposed surfaces 20 and 23 of the body and nut, respectively, acting upon the tapered surfaces 30 and 31 of the sleeve 25 function to deform the sleeve inwardly in the zones opposite the camming surfaces 20 and 23, thus reducing the diameter of the sleeve particularly in the zones 31 and 32 and hence strongly compressing the material of the tube against the nipple 26. This action results in the production of a mechanically strong, leak-proof connection between the tube and the clamping member 12, and between the clamping member and the body at the surface 30 of the sleeve. During the clamping operation, the clamping member is moved farther into the recess 17, the recess being of sufficient depth to permit this movement, there being clearance between the shoulder 19 and the end of the member 12, as indicated at 29. The clamping member is firmly held in engagement with the body by the surface 23 of the nut.

It will be noted that after the clamping operation the material of the tube substantially fills the annular space between the sleeve and the nipple. This occurs because of the fact that the plastic material of which the tube is composed flows to a certain extent under the pressures produced, and while this flow is of limited extent as distinguished from the relatively high flow of rubber or rubber-like materials under the corresponding pressures, nevertheless the flow is of importance for the enlargement of the wall thickness tubing in the zones 33 and 34 contributes considerably to the mechanical strength of the connection. The thickened portions 33 and 34 lock the tubing within the clamping member, and this result is obtained without unduly reducing the wall thickness of the tubing in the zones 31 and 32. The internal nipple 26 prevents any substantial reduction in internal diameter of the tube, and thus the fitting does not substantially restrict the flow of fluid through the tube.

In Figures 3 and 4, I have shown a modified form of my fitting, the modification being only in the construction of the clamping sleeve 35. Here, the nut 10 and body 11 are employed with a two-piece clamping member comprising a sleeve 36 and a separately formed nipple 37. The exterior of the sleeve 36 is substantially identical with that of the sleeve 35, with tapered body surfaces 38 and 39 and an initially cylindrical internal surface 40. At its end the sleeve is provided with an inwardly extending flange 41 recessed at 42 to provide a shoulder. The nipple, as shown in Figure 4 is initially a tubular member having a bead 43 thereon. The external diameter of the tubular member corresponds to the internal diameter of the flange 41 and the internal diameter of the recess 42 corresponds to the external diameter of the bead 43. The sleeve and nipple are assembled as shown in Figure 4, then the assembly is subjected to a further operation, preferably in a punch press, to flange the end portion 44 thereof so that the flange 41 of the sleeve 36 is clamped between the flanged end 44 of the nipple and the bead 43. Thus the nipple and the sleeve are securely held together providing a completed assembly which operates in substantially the same manner as the one-piece clamping ring of the previous modification. When the assembly is clamped between the body 10 and the nut 11 of the sleeve is deformed inwardly to clamp the tube end as shown in Figure 3 and substantially as described in conjunction with the previous modification.

This second type of clamping ring of sleeve and nipple assembly is useful where the proportions of the parts or the materials of which they are made makes the machining of the clamping ring 12 in Figure 1 expensive or difficult to carry out. Generally speaking, the parts may be substituted one for the other, the determination of which will be used depending largely on the cost of manufacture.

From the foregoing description of preferred forms of my invention it will be seen that I have provided couplings particularly adapted for use with the tubing composed of plastic materials. My couplings can be readily manufactured by screw machine or other economical operations. The couplings can be assembled readily, no particular skill being required, as it is only necessary to slip the nut over the end of the tube, insert the end of the tube into the clamping ring as far as it will go, then to insert the clamping ring into the recess of the body and tighten the nut on to the body to deform the clamping ring into engagement with the tube. Connections made with my couplings can be taken apart and reconnected many times without damage or impairment of efficiency. Because of the compression of the material of the tube between the sleeve and nipple a fluid-tight and strong mechanical joint is provided.

Various changes and modifications can be made in my invention without departing from the spirit and scope thereof, and accordingly it is to be understood that my patent is not limited to the preferred forms described herein nor in any manner other than by the scope of the appended claims.

I claim:

1. A coupling for plastic tubing comprising a sleeve having a thickened portion providing an exterior annular projection, a nipple having a substantially cylindrical exterior surface disposed within said sleeve and joined thereto adjacent one end thereof, said sleeve and nipple together forming an annular chamber adapted to receive the end of a tube, a body having a recess adapted to receive the assembly of tube end, sleeve, and nipple, and means for securing said assembly within said recess, said body and said securing means having opposed annular cam surfaces adapted to engage the annular projection on said sleeve and deform the same inwardly thereby to clamp the material of the tube between said sleeve and nipple.

2. A coupling for plastic tubing comprising a sleeve having a thickened portion providing an exterior annular projection, a nipple disposed within said sleeve, said sleeve and nipple together forming an annular chamber adapted to receive the end of a tube, a body having a recess adapted to receive the assembly of tube, sleeve, and nipple, and means for securing said assembly within said recess, said body and said securing means being adapted to engage the annular projection on said sleeve and deform the same inwardly thereby to clamp the material of the tube between said sleeve and nipple, said recess being of sufficient depth to permit said sleeve to move inwardly into said recess during the clamping operation.

3. A tube coupling comprising a sleeve having a thickened portion providing an exterior annular projection, a nipple disposed within said sleeve, said sleeve and nipple together forming an annular chamber adapted to receive the end of a tube, a body, and a nut in threaded engagement therewith, said body and said nut being adapted to engage said annular projection on said sleeve and deform the same inwardly thereby to clamp the material of the tube between said sleeve and nipple.

4. A tube coupling comprising a sleeve, a nipple having a substantially cylindrical exterior surface disposed within said sleeve, said sleeve and nipple together forming an annular chamber adapted to receive the end of a tube, a body, and a nut in threaded engagement therewith, said body and said nut being adapted to engage said sleeve and deform the same inwardly thereby to clamp the material of the tube between said sleeve and nipple.

5. A tube coupling comprising a body, a nut in threaded engagement therewith, and a clamping member, said clamping member comprising a sleeve having an exterior annular projection, a nipple disposed within said sleeve, said sleeve and nipple together forming an annular chamber adapted to receive the end of a tube, said body having an open-ended cylindrical recess terminating in an inwardly extending shoulder adapted to receive said clamping member, said body and said nut having opposed annular cam surfaces adapted to engage the annular projection on said sleeve and deform the same inwardly thereby to clamp the material of the tube between said sleeve and said nipple and secure said clamping member within said recess, said recess being of such depth that there is clearance between the end of the sleeve and said shoulder after said clamping member is secured within said recess.

6. A tube coupling comprising a body, a nut in theaded engagement therewith, and a clamping member, said clamping member comprising a sleeve having an exterior annular projection, a nipple disposed within said sleeve and formed integrally therewith, said sleeve and nipple together forming an annular chamber adapted to receive the end of a tube, said body having a recess adapted to receive said clamping member, said body and said nut having opposed annular cam surfaces adapted to engage the annular projection on said sleeve and deform the same inwardly thereby to clamp the material of the tube between said sleeve and said nipple and secure said clamping member within said recess.

7. A tube coupling comprising a body, a nut in threaded engagement therewith, and a clamping member, said clamping member comprising a sleeve having an exterior annular projection, a separately formed nipple disposed within said sleeve, said sleeve and nipple being secured together by interengaging flange portions and said sleeve and nipple together forming an annular chamber adapted to receive the end of a tube, said body having a recess adapted to receive said clamping member, said body and said nut having opposed annular cam surfaces adapted to engage the annular projection on said sleeve and deform the same inwardly thereby to clamp the material of the tube between said sleeve and said nipple and secure said clamping member within said recess.

8. A clamping member for plastic tubing comprising a continuous sleeve having a thickened portion providing an exterior annular projection, a nipple having a substantially cylindrical exterior surface disposed within said sleeve and joined thereto adjacent one end thereof, said sleeve and nipple together forming an annular chamber adapted to receive the end of a tube and having a shoulder adapted to engage the end of the tube, said sleeve being deformable inwardly to clamp the end of a tube and compress the material thereof against said nipple.

9. A clamping member for plastic tubing comprising a sleeve having a thickened portion providing an exterior annular projection, a nipple disposed within said sleeve and formed integrally therewith and joined thereto adjacent one end thereof, said sleeve and nipple together forming an annular chamber adapted to receive the end of a tube and having a shoulder adapted to engage the end of the tube, said sleeve being deformable inwardly to clamp the end of a tube and compress the material thereof against said nipple.

10. A clamping member for plastic tubing comprising a sleeve having a thickened portion providing an exterior annular projection, a separately formed nipple disposed within said sleeve and joined thereto adjacent one end thereof, said sleeve and nipple together forming a substantially cylindrical annular chamber adapted to receive the end of a tube and having a shoulder adapted to engage the end of the tube, said sleeve being deformable inwardly to clamp the end of a tube and compress the material thereof against said nipple.

HENRY D. STECHER.